(12) United States Patent
Schmid

(10) Patent No.: US 9,061,457 B2
(45) Date of Patent: Jun. 23, 2015

(54) STRIPPER SLEEVE

(75) Inventor: Markus Schmid, Dietmanns (AT)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 0 days.

(21) Appl. No.: 14/237,233

(22) PCT Filed: Jul. 25, 2012

(86) PCT No.: PCT/CA2012/050500
§ 371 (c)(1),
(2), (4) Date: Feb. 5, 2014

(87) PCT Pub. No.: WO2013/029167
PCT Pub. Date: Mar. 7, 2013

(65) Prior Publication Data
US 2014/0178521 A1    Jun. 26, 2014

Related U.S. Application Data

(60) Provisional application No. 61/528,803, filed on Aug. 30, 2011.

(51) Int. Cl.
*B29C 45/44* (2006.01)
*B29C 33/44* (2006.01)
*B29L 31/56* (2006.01)
*B29C 45/40* (2006.01)

(52) U.S. Cl.
CPC ........... *B29C 45/4407* (2013.01); *B29C 33/444* (2013.01); *B29L 2031/565* (2013.01); *B29C 2045/4078* (2013.01)

(58) Field of Classification Search
CPC .............. B29C 45/4407; B29C 2045/4407; B29C 2045/4078; B29C 33/444; B29L 2031/565

USPC ........................................ 425/441, DIG. 58
See application file for complete search history.

(56) References Cited

U.S. PATENT DOCUMENTS

| | | | | |
|---|---|---|---|---|
| 4,526,282 A | * | 7/1985 | Dutt et al. | 215/252 |
| 4,793,499 A | | 12/1988 | Dubach et al. | |
| 4,881,892 A | | 11/1989 | Webster et al. | |
| 5,086,938 A | * | 2/1992 | Aichinger | 215/252 |
| 5,230,856 A | * | 7/1993 | Schellenbach | 264/328.1 |
| 5,240,719 A | * | 8/1993 | Hedgewick | 425/556 |
| 5,281,385 A | * | 1/1994 | Julian | 264/318 |
| 5,833,912 A | * | 11/1998 | Schweigert et al. | 264/318 |
| 6,413,075 B1 | * | 7/2002 | Koch et al. | 425/526 |
| 6,450,797 B1 | | 9/2002 | Joseph | |
| 7,128,865 B2 | * | 10/2006 | Martin | 264/318 |
| 7,429,170 B2 | * | 9/2008 | Rote et al. | 425/350 |
| 7,510,677 B2 | | 3/2009 | Miller et al. | |
| 2012/0135102 A1 | * | 5/2012 | Glaesener | 425/556 |
| 2012/0251656 A1 | * | 10/2012 | Wang et al. | 425/556 |

OTHER PUBLICATIONS

PCT International Search Report; Cuerrier, Pierre; 3 pages; Aug. 20, 2012.

* cited by examiner

*Primary Examiner* — Yogendra Gupta
*Assistant Examiner* — Emmanuel S Luk

(57) ABSTRACT

There is provided a molding stack (102). The molding stack (102) comprises a stripper sleeve (122) that is movable to contact a molded article (114) after the molding thereof; the stripper sleeve (122) having a first surface (204) and a second surface (206) for simultaneously contacting a side and an underside surface, respectively, of the molded article (114) during the stripping of the molded article (114).

2 Claims, 2 Drawing Sheets

STRIPPER SLEEVE

TECHNICAL FIELD

The non-limiting embodiments disclosed herein generally relate to the structure and operation of a molding apparatus, and more particularly to a stripper sleeve.

BACKGROUND

Molding is a process by virtue of which a molded article can be formed from molding material by using a molding system. Various molded articles can be formed by using the molding process, such as an injection molding process. One example of a molded article that can be formed, for example, from polypropelene (PP material) is a closure suitable for capping, in use, a beverage container, such as, a container for still water or a carbonated drink.

A typical molding system includes inter alia an injection unit, a clamp assembly and a mold assembly. The injection unit can be of a reciprocating screw type or of a two-stage type. Within the reciprocating screw type injection unit, raw material (such as PP, PET or the like) is fed through a hopper, which in turn feeds an inlet end of a plasticizing screw. The plasticizing screw is encapsulated in a barrel, which is heated by barrel heaters. Helical flights of the screw convey the raw material along an operational axis of the screw. Typically, a root diameter of the screw is progressively increased along the operational axis of the screw in a direction away from the inlet end.

As the raw material is being conveyed along the screw, it is sheared between the flights of the screw, the screw root and the inner surface of the barrel. The raw material is also subjected to some heat emitted by the barrel heaters and conducted through the barrel. As the shear level increases in line with the increasing root diameter, the raw material, gradually, turns into substantially homogenous melt. When a desired amount of the melt is accumulated in a space at discharge end of the screw (which is an opposite extreme of the screw vis-à-vis the inlet end), the screw stops its rotation. The screw is then forced forward (in a direction away from the inlet end thereof), forcing the desired amount of the melt into one or more molding cavities. Accordingly, it can be said that the screw performs two functions in the reciprocating type injection unit, namely (i) plasticizing of the raw material into a substantially homogeneous melt and (ii) injecting the substantially homogeneous melt into one or more molding cavities.

U.S. Pat. No. 6,450,797 issued to Joseph on Sep. 17, 2002 teaches a molding apparatus that has a pair of slide inserts which are laterally movable into and out of engagement with the other mold components. The lateral movement of the slide inserts is provided by a slide mechanism having a driving rack, a pair of drive pinions at either end of the driving rack, two pairs of driven racks and a plurality of slides connected to the driven racks. The driven racks of each pair are parallel and spaced from one another, engaging opposite sides of a pinion and thereby being driven in opposite directions by rotation of the pinion. The molding apparatus is more compact than conventional devices having slide inserts, eliminates the use of slide retainers, eliminates obstructions between the mold plates when the plates are separated, and can cycle faster than conventional devices.

U.S. Pat. No. 7,510,677 issued to Miller, et al. on Mar. 31, 2009 discloses an injection molding method and apparatus for ejecting a molded plastic article from a mold. A lifting structure and/or step is provided with a lifting portion which is configured to contact substantially one half of an end of the molded plastic article along a line substantially perpendicular to the lifting direction. Since the molded plastic article is lifted by its end, the article does not have to be solidified at its interior, thus allowing earlier removal of the article from the mold, reducing cycle time. A tapered surface forms an acute angle with respect to the lifting portion to form a tight seal with the mold, preventing leakage. Preferably, the neck ring engages only an outer circumferential portion of the molded plastic article during a majority of a mold opening stroke.

U.S. Pat. No. 4,881,892 issued to Webster, et al. on Nov. 21, 1989 teaches a mold for forming a plastic closure includes a first mold part defining a female cavity and a second mold part defining a male mold cavity surface, with the second mold part including a core having a knock-out pin reciprocated therein and surrounded by a fixed sleeve which cooperate to define a tamper evident band on the cavity for the closure. Vents are provided for venting the lower edge of the cavity during the ejection-molding process. Also, the knock-out pin has a lubricant pocket formed on the peripheral surface thereof.

SUMMARY

According to a first broad aspect of the present invention, there is provided a molding stack. The molding stack comprises a stripper sleeve that is movable to contact a molded article after the molding thereof; the stripper sleeve having a first surface and a second surface for simultaneously contacting a side and an underside surface, respectively, of the molded article during the stripping of the molded article.

According to a second broad aspect of the present invention, there is provided a stripper sleeve for use in the molding stack, the stripper sleeve being configured to be movable to contact a closure after the molding thereof, the stripper sleeve comprising: a pocket having a first surface and a second surface for simultaneously contacting a side and an underside surface, respectively, of the closure during the stripping of the closure These and other aspects and features will now become apparent to those skilled in the art upon review of the following description of specific non-limiting embodiments in conjunction with the accompanying drawings.

DETAILED DESCRIPTION OF THE DRAWINGS

The detailed description of illustrative (non-limiting) embodiments will be more fully appreciated when taken in conjunction with the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Figure 1:
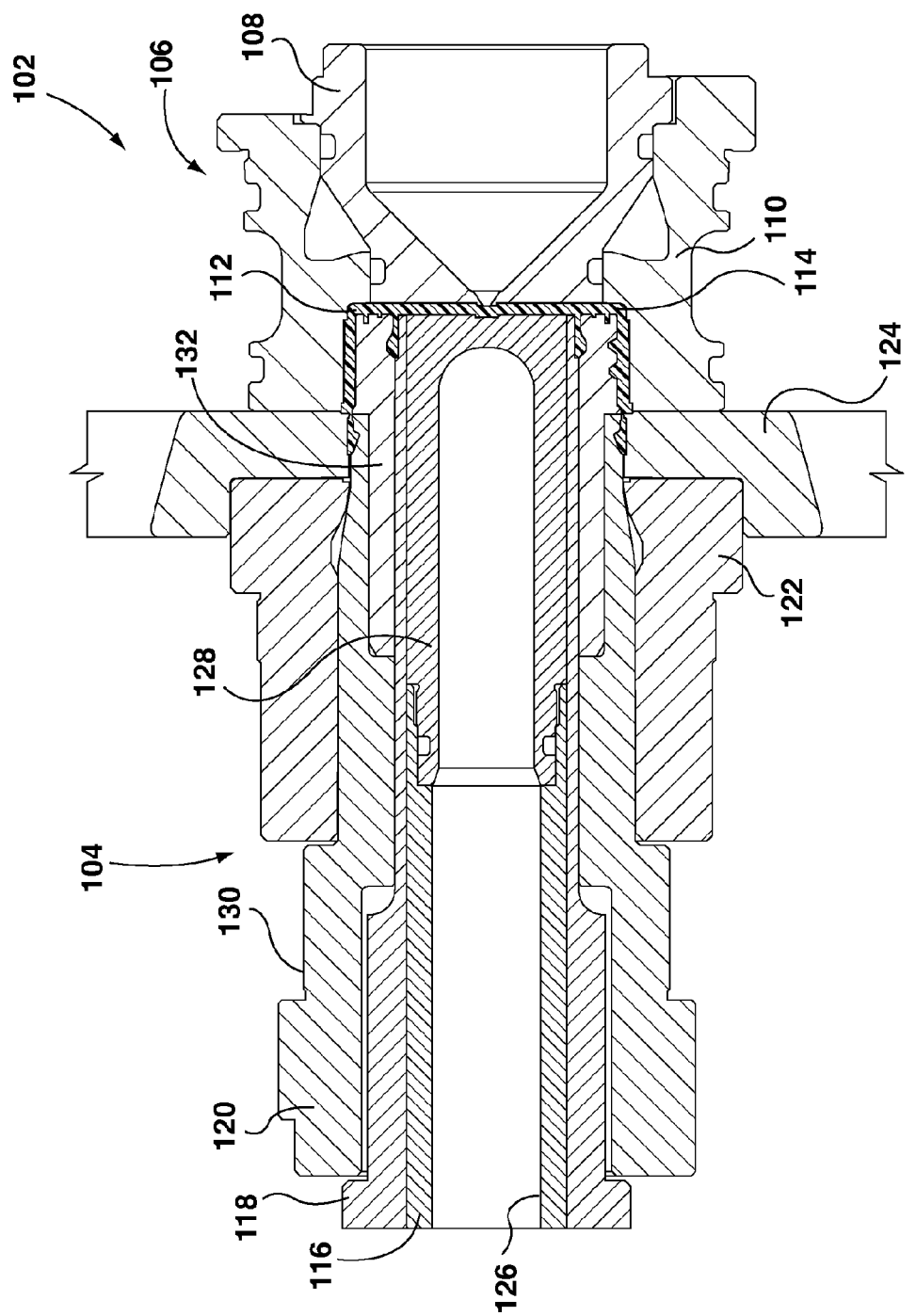
FIG. 1 depicts a schematic representation of a cross-section of a portion of a molding stack, taken along operational axis thereof, the molding stack being implemented in accordance with various non-limiting embodiments of the present invention.

FIG. 1 depicts a schematic representation of a cross-section of a portion of a molding stack 102, taken along operational axis thereof, the molding stack 102 being implemented in accordance with various non-limiting embodiments of the present invention. The molding stack 102 can be part of a mold (not depicted) that is positionable within a clamp (not depicted) of an injection molding machine (not depicted). It is noted that the implementation of the mold, the clamp and the injection molding machine can be typical to that of prior art implementations and, as such, will not be described here at any length. It is also noted that embodiments of present invention can be used within various implementations of the mold, such as, an injection mold, an injection-compression mold, a compression mold, a transfer-molding mold and the like (as well, as the associated machines).

The molding stack 102 includes a core assembly 104 and a cavity assembly 106. Starting with the cavity assembly 106, the cavity assembly 106 comprises a gate insert 108 and a cavity insert 110. The general purpose for the gate insert 108 is to receive, in use, a nozzle of a hot runner (both not depicted) and for providing a path for molten material into a molding cavity 112. The cavity insert 110 defines a portion of the molding cavity 112 and, more specifically, an outside wall of a top panel and a side skirt of a molded article 114, which molded article 114 is defined within the molding cavity 112. Within this illustration, molded article 114 comprises a closure 114 of a types suitable for capping a beverage container and the like. The cavity insert 110 also comprises cooling channels through which an appropriate coolant media (such as water and the like) can be circulated during appropriate portions of the molding cycle.

The core assembly 104 comprises a first inner core 116, a second inner core 118, an outer core 120, a stripper sleeve 122 and a pair of split inserts 124. Since the general function of the components of the core assembly 104 is known to those of ordinary skill in the art, only a brief description thereof will be presented here.

The purpose of the first inner core 116 is to define an inner portion of the top panel of the closure 114. In the specific embodiment of the present invention, the first inner core comprises a first inner core portion 126 and a second inner core portion 128. In a specific example provided herewith, the first inner core portion 126 and the second inner core portion 128 can be made of different materials, such as materials with different thermal conductivity, materials with different wear resistance and the like. In a specific embodiment, the first inner core portion 126 and the second inner core portion 128 can be made of different materials to improve heat dissipation between portions thereof. In a specific non-limiting embodiment of the present invention, the first inner core portion 126 can be made of stainless steel (DIN: 1.4528) and the second inner core portion 128 can be made of AMPCOLOY 940.

In alternative embodiments of the present invention, the first inner core 116 can be made up of more than two portions or be of unitary structure. It is noted that the first inner core 116 is configured, under motive of an actuator (not depicted) to move in an axial direction, i.e. left and right as viewed in FIG. 1. The first inner core 116 comprises an inner cooling channel (not separately numbered) through which an appropriate coolant media (such as water and the like) can be circulated during appropriate portions of the molding cycle.

The purpose of the second inner core 118 is to define a portion of the top panel (not separately numbered) of the closure 114. The second inner core 118 also defines a portion of a plug seal (not separately numbered), which plug seal depends from the top panel of the closure 114. The second inner core 118 is stationary, within the depicted embodiments of the present invention.

The purpose of the outer core 120 is to define (i) another portion of the plug seal and the top panel of the closure 114 (including the centering ring thereof), (ii) an inner portion of a skirt (not separately numbered) of the closure 114 (including features of a thread finish) and (iii) a bottom-most portion of a tamper evident band of the closure 114. Within the specific embodiment illustrated herein, the outer core 120 comprises a first outer core portion 130 and a second outer core portion 132. In a specific example provided herewith, the first outer core portion 130 and the second outer core portion 132 can be made of different materials, such as materials with different thermal conductivity, materials with different wear resistance and the like. In a specific embodiment, the first outer core portion 130 and the second outer core portion 132 can be made of different materials to improve heat dissipation between portions thereof. In a specific non-limiting embodiment of the present invention, the first outer core portion 130 can be made of stainless steel (DIN: 1.2767) and the second outer core portion 132 can be made of AMPCOLOY 940.

In alternative embodiments of the present invention, the outer core 120 can be made up of more than two portions or be of unitary structure. As such, within embodiments of the present invention, the first outer core portion 130 is configured to define the bottom-most portion of the closure 114 and a portion of the inner portion of the skirt. The second outer core portion 132 is configured to define the portion of the plug seal, another portion of the inner portion of the skirt and the portion of the top panel of the closure 114. Its is noted that the outer core 120 is configured, under motive of an actuator (not depicted) to move in an axial direction, i.e. left and right as viewed in FIG. 1.

The purpose of the pair of split inserts 124 is to define a portion of the outer portion of the skirt of the closure 114, including but not limited to a tamper evident band and bridges connecting the tamper evident band to the remainder of the skirt of the closure 114. The pair of split inserts 124 are configured, under motive of an actuator (not depicted) to move in a traverse direction, i.e. up and down as viewed in FIG. 1.

The purpose of the stripper sleeve 122 is to assist in stripping the closure 114 off the molding stack 102, as will be described in detail momentarily. The stripper sleeve 122 is configured, under a motive of an actuator (not depicted) to move in an axial direction, i.e. left and right as viewed in FIG. 1. More specifically, the stripper sleeve 122 is configured to move between a "retracted configuration" depicted in FIG. 1 and an "extended configuration", which is not depicted, but which is generally located axially towards right, as viewed in FIG. 1.

Figure 2:
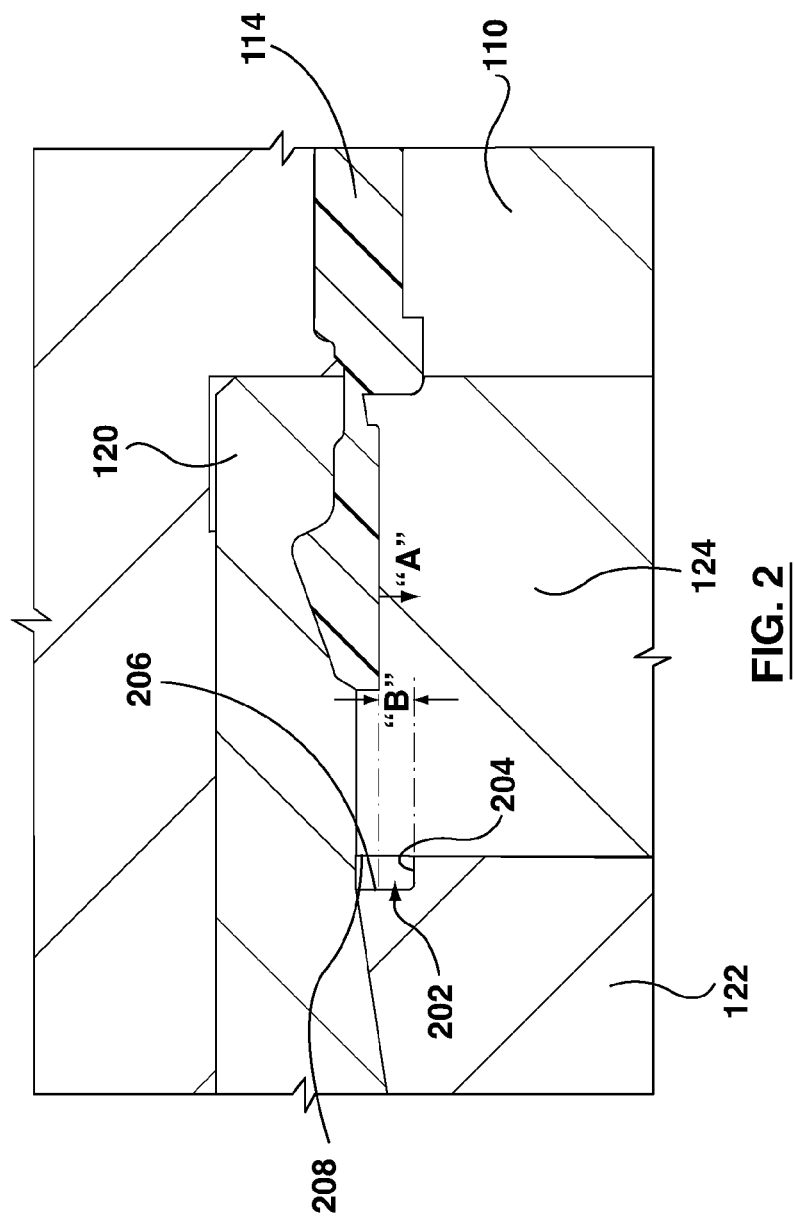
FIG. 2 depicts a portion of the molding stack of FIG. 1 in greater detail.

According to embodiments of the present invention and is best seen in FIG. 2, which FIG. 2 depicts a portion of the molding stack 102 in greater detail. The stripper sleeve 122 comprises a pocket 202. The pocket 202 is defined by a first axial wall 204 and a second traverse wall 206. In use, during the part ejection function, the stripper sleeve 122 is extended, under the motive of an actuator (not depicted) towards the extended configuration, in which extended configuration the stripper sleeve 122 engages the bottom-most portion of the closure 114. More specifically, the pocket 202 engages the bottom-most portion of the closure 114. Even more specifically and in accordance with embodiments of the present invention, the second traverse wall 206 engages the underside of the bottom-most portion of the tamper evident band of the closure 114 and, effectively, pushes it to the right, as viewed in FIG. 1, with further movement of the stripper sleeve 122. At the same time, the first axial wall 204 engages a side portion of the taper evident band. Even more specifically, the first axial wall 204 provides a stopper (i.e. a physical stop) which delimits the extent of radial travel of the tamper evident band, which radial travel occurs as the closure 114 is stripped off the molding stack 102 and, especially, as portions of the closure 114 clear portions of the outer core 120 (such as portions of the first outer core portion 130). For the avoidance of doubt, the term "radial travel" means travel in a direction that is traverse to the axis of the molding stack 102.

It is noted that even though in the specific embodiment being depicted herein, the first axial wall 204 and the second traverse wall 206 are inter-disposed at a 90 degree angle therebetween, this does not need to be so in every embodiment of the present invention. As such, it should be expressly understood that in alternative embodiments of the present invention, the first axial wall 204 and the second traverse wall 206 can be inter-disposed at a different angle therebetween.

Accordingly, it can be said that the stripper sleeve 122 is movable to contact a molded article 114 after the molded article 114 has been molded or, in other words, the stripper sleeve 122 does not define any portion of the molding cavity 112 during molding of the molded article 114. It can be further said that the stripper sleeve 122 comprises a first surface (i.e. the first axial wall 204) and a second surface (i.e. the second traverse wall 206), which first and second surfaces engage simultaneously, during stripping of the molded article 114, a side surface and an underside of the molded article 114 (and more specifically, the underside and the side portion of the bottom-most portion of the closure 114, i.e. the tamper evident band of the closure 114).

To this end, the depth of the pocket 202, or more specifically the distance between an edge 208 and the first axial wall 204 is such as (i) to allow the portion of the closure 114 to deflect in the direction "A" to clear certain features of the outer core 120 (i.e. the first outer core portion 130), and (ii) to prevent significant damage attributable to "over-deflection" of the portion of the closure 114 in the direction "A", typically associated with prior art executions of the molding stack 102. The extent of "allowable" travel for the portion of the closure 114 is shown in FIG. 2 as "B".

Having described the structure of the non-limiting embodiments of the molding stack 102, a brief description of the operational sequence thereof, in the context of part ejection, will be presented herein.

Mold Closed, Molding and Cooling

The molding process starts with urging the molding stack 102 into a mold closed position, as is depicted in FIG. 1. The molding stack 102 is actuated into and maintained in the mold closed configuration by a clamp arrangement (not depicted) under sufficient clamp tonnage (i.e. tonnage sufficient to withstand injection pressure of the molding material). More specifically, the core assembly 104 and the cavity assembly 106 are urged in the mold closed configuration, whereby the molding cavity 112 is defined and is available for acceptance of the molding material.

Then, in the mold closed configuration, molding material is injected, under pressure, into the molding cavity 112 via an orifice (not separately numbered) in the gate insert 108. The molding material is then allowed to cool down and, typically, as the molding material solidifies and cools down it shrinks. As such, in some embodiments of the present invention, a packing function is executed, whereby extra molding material is injected into the molding cavity 112 to compensate for the molding material shrinkage.

The molding material is allowed to cool down to a temperature whereby it is safe to eject the molded article 114 without significant structural damage thereto.

Molded Article Ejection

At this point, where the molding material has sufficiently cooled down and the molded article 114 has sufficiently solidified for safe ejection thereof, the process of molded article ejection commences.

First, clamp tonnage is released. Next, a core plate (not depicted) accommodating the core assembly 104 is urged away from a cavity plate (not depicted) accommodating the cavity assembly 106 or vice versa, the cavity plate can be urged away from the core plate. Since the molded article 114 tends to shrink as it cools down and due to the number of undercuts associated with the closure 114, the closure 114 tends to stay associated with the core assembly 104.

Once the closure 114 has sufficiently cleared the portion of the molding cavity 112 associated with the cavity insert 110, the split inserts 124, under control of the appropriate actuator (not depicted) are urged transversely away from the outer core 120, thus releasing the undercuts of the tamper evident band of the closure 114.

Next, under the motive of the appropriate actuator (not depicted), the stripper sleeve 122 is actuated into the extended configuration, whereby the pocket 202 engages the bottom-most portion of the closure 114.

Next, the first inner core 116, the outer core 120 and the stripper sleeve 122 move in unison to effectively release the plug seal of the closure 114 from in-between the second inner core 118 and the outer core 120 (recalling that within these embodiments of the present invention, the second inner core 118 is stationary).

Once the plug seal of the closure 114 is released, the outer core 120 becomes immobile (for example, by means of actuator stopping it or by means of a physical stop), and the first inner core 116 and the stripper sleeve 122 continue to move. In some embodiments of the present invention, the first inner core 116 and the stripper sleeve 122 continue to move in unison until the closure 114 is stripped off the first inner core 116. In other embodiments, the first inner core 116 can, at some point, become immobile (for example, by means of actuator stopping it or by means of a physical stop), and the stripper sleeve 122 completing the stripping action.

Effectively, at this point, the closure 114 is released (or stripped off) the molding stack 102.

It is noted that a specific technical advantage associated with embodiments of the present invention includes, alleviation of certain defects associated with the closure 114 with the prior art solutions and, specifically, defects attributable to over-stretching of the tamper evident band of the closure 114 during stripping thereof.

It is noted that the foregoing has outlined some of the more pertinent non-limiting embodiments. These non-limiting embodiments may be used for many applications. Thus, although the description is made for particular arrangements and methods, the intent and concept of these non-limiting embodiments may be suitable and applicable to other arrangements and applications. It will be clear to those skilled in the art that modifications to the disclosed non-limiting embodiments can be effected. The described non-limiting embodiments ought to be construed to be merely illustrative of some of the more prominent features and applications thereof. Other beneficial results can be realized by applying these non-limiting embodiments in a different manner or modifying them in ways known to those familiar with the art. This includes the mixing and matching of features, elements and/or functions between various non-limiting embodiments is expressly contemplated herein, unless described otherwise, above.

What is claimed is:

1. A molding stack, comprising:

a stripper sleeve that is movable to contact a molded article after the molding thereof;

the stripper sleeve having a first surface and a second surface for simultaneously contacting a side and an underside surface, respectively, of the molded article during the stripping of the molded article;

wherein the stripper sleeve comprises a pocket, which pocket defines the first surface and the second surface;

wherein the first surface comprises a first axial wall, the first axial wall being configured to engage the side portion of a tamper evident band of a closure;

wherein the first axial wall provides a stopper, which delimits an extent of radial travel of the tamper evident band of the closure during stripping thereof;

wherein the pocket is associated with a depth, which depth represents a distance between an edge of the second surface where it meets an inner surface of the stripper sleeve and the first axial wall, whereby the depth is selected such as (i) to allow the portion of the tamper evident band of the closure to deflect in a direction to clear a feature of the molding stack, and (ii) to prevent significant damage attributable to "over-deflection" of the portion of the tamper evident band of the closure in the direction;

wherein the depth of the pocket is selected to accommodate an allowable travel path for the portion of the tamper evident band of the closure;

the second surface comprises a second traverse wall, said second traverse wall being configured to engage a bottom-most portion of a tamper evident band of the closure.

2. A stripper sleeve for use in the molding stack, the stripper sleeve being configured to be movable to contact a closure after the molding thereof, the stripper sleeve comprising:

a pocket having a first surface and a second surface for simultaneously contacting a side and an underside surface, respectively, of the closure during the stripping of the closure;

wherein the first surface comprises a first axial wall, the first axial wall being configured to engage the side portion of a tamper evident band of the closure;

wherein the first axial wall provides a stopper, which delimits an extent of radial travel of the tamper evident band of the closure during stripping thereof;

wherein the pocket is associated with a depth, which depth represents a distance between an edge of the second surface where it meets an inner surface of the stripper sleeve and the first axial wall, whereby the depth is selected such as (i) to allow the portion of the tamper evident band of the closure to deflect in a direction to clear a feature of the molding stack, and (ii) to prevent significant damage attributable to "over-deflection" of the portion of the tamper evident band of the closure in the direction;

wherein the depth of the pocket is selected to accommodate an allowable travel path for the portion of the tamper evident band of the closure;

wherein the second surface comprises a second traverse wall, said second traverse wall being configured to engage a bottom-most portion of a tamper evident band of the closure.

* * * * *